United States Patent [19]

Maier

[11] Patent Number: 5,664,661
[45] Date of Patent: Sep. 9, 1997

[54] CONVEYOR ASSEMBLY FOR REORIENTING ITEMS

[75] Inventor: Willi Maier, Kloten, Switzerland

[73] Assignee: Grapha-Holding AG, Hergiswil, Switzerland

[21] Appl. No.: 600,458

[22] Filed: Feb. 13, 1996

[30] Foreign Application Priority Data

Feb. 17, 1995 [CH] Switzerland .................. 467/95

[51] Int. Cl.⁶ ............................................. B65G 47/24
[52] U.S. Cl. ................................... 198/412; 198/413
[58] Field of Search ........................... 198/395, 400, 198/412, 413, 598, 459.8, 502.2, 461.1

[56] References Cited

U.S. PATENT DOCUMENTS

| | | |
|---|---|---|
| 2,841,269 | 7/1958 | Jenney et al. |
| 2,997,187 | 8/1961 | Burt .................. 198/412 X |
| 3,508,640 | 4/1970 | Good et al. ........... 198/412 X |
| 4,328,889 | 5/1982 | Maxted. |
| 4,376,481 | 3/1983 | Franklin .............. 198/413 X |
| 4,533,033 | 8/1985 | Van Wegen ............ 198/413 |
| 4,598,815 | 7/1986 | Adama. |
| 4,682,682 | 7/1987 | Hartlepp. |
| 4,915,209 | 4/1990 | Lanziani ............ 198/502.2 X |
| 5,145,049 | 9/1992 | McClurkin ........... 198/395 X |

FOREIGN PATENT DOCUMENTS

| | | |
|---|---|---|
| 18 06 888 | 7/1969 | Germany. |
| 1156756 | 7/1969 | United Kingdom. |
| 2 145 387 | 3/1985 | United Kingdom. |

*Primary Examiner*—James R. Bidwell
*Attorney, Agent, or Firm*—Spencer & Frank

[57] ABSTRACT

A conveyor assembly for reorienting items includes a conveyor for advancing items in a conveying direction; and a turning device disposed upstream of the discharge end of the conveyor as viewed in the conveying direction for engaging an underface of the items and for turning the items into a predetermined orientation, while being conveyed by the conveyor, before the items reach the discharge end.

11 Claims, 2 Drawing Sheets

CONVEYOR ASSEMBLY FOR REORIENTING ITEMS

CROSS REFERENCE TO RELATED APPLICATION

This application claims the priority of Swiss Application No. 00 467/95-2 filed Feb. 17, 1995, which is incorporated herein by reference.

BACKGROUND OF THE INVENTION

This invention relates to a conveyor assembly for reorienting items thereon for the controlled charging of carriages of a sorting apparatus situated at the discharge end of the conveyor assembly. The assembly includes a conveyor which is associated with a device for aligning items on the conveyor prior to their transfer to the sorting apparatus.

A conveyor assembly of the above-outlined type is disclosed, for example, in U.S. Pat. No. 4,682,682. The assembly described therein includes an obliquely oriented conveyor belt having fingers which are arranged in an L-shaped pattern and which are lowerable between the parallel, partial belts of the conveyor belt. For aligning a package or similar item, the fingers are raised until they project beyond the upper surface of the oblique belt. The item placed on the oblique belt runs up the fingers and is aligned and stopped thereby. After the item is aligned, the fingers are lowered by means of a drive mechanism positioned underneath the oblique belt. The aligned package is continued to be advanced in an aligned orientation by the oblique conveyor belt in the conveying direction and transferred to the carriage of the sorting apparatus. The alignment of relatively large items has the advantage that the division of the sorting apparatus may be held at a small value and, accordingly, high output values may be achieved.

SUMMARY OF THE INVENTION

It is an object of the invention to provide an improved conveyor assembly of the above-outlined type which is characterized by a higher output while having an economical construction and a high operational safety. The assembly is intended for conveying packages, particularly postal parcels.

This object and others to become apparent as the specification progresses, are accomplished by the invention, according to which, briefly stated, the conveyor assembly for reorienting items includes a conveyor for advancing items in a conveying direction and a turning device disposed upstream of the discharge end of the conveyor as viewed in the conveying direction for engaging an underface of the items and for turning the items into a predetermined orientation, while being conveyed by the conveyor, before the items reach the discharge end.

The conveyor assembly according to the invention catches and rotates the items during the conveying motion. Since the items need not be braked to a standstill and subsequently accelerated, the dwelling period of the items on the conveyor is reduced and thus the conveyor output is increased. The alignment of the items is particularly accurate if, according to a further feature of the invention, prior to the pivotal motion the length of the individual items is measured which may be effected, for example, by means of light barriers.

According to a further feature of the invention which particularly contributes to the economic manufacture and the operational safety of the assembly, the turning device has at least one driven orienting roller. The orienting roller may be lowerable so that the items may be selectively engaged and turned by the orienting roller. By means of the orienting roller an item to be turned may be lifted at its frontal end. Such a raised item then lies substantially with its rear edge on the upper surface of the conveyor and can be turned very rapidly and with very low friction.

According to another advantageous feature of the invention, the turning device is situated in a transversely extending clearance between two belts. The clearance may be relatively narrow so that even very small items are not caught by the clearance. Advantageously, downstream of the turning apparatus a cyclically operated belt is provided so that the aligned items may be taken over and discharged in a periodic, cadenced manner. Such an arrangement makes possible a very accurate transfer of the items to the carriage of the sorting apparatus.

DESCRIPTION OF THE PREFERRED EMBODIMENT

Figure 1:
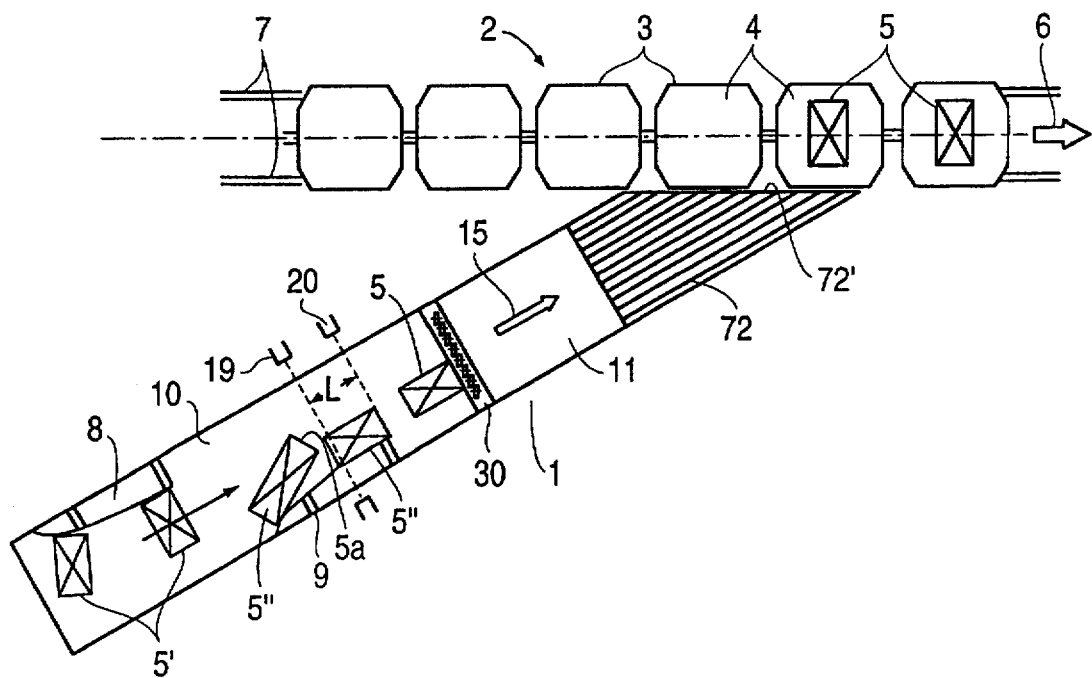
FIG. 1 is a schematic top plan view of a conveyor assembly according to a preferred embodiment.

Turning to FIG. 1, there is shown a portion of an endless sorting apparatus 2 which includes a plurality of interconnected carriages 3 guided on rails 7 for displacement in the direction of the arrow 6. Each carriage 3 has a supporting plate 4 that may tipped at least to one side in a discharging station (not shown). The items 5 to be sorted are, for example, packages which are placed on the supporting plate 4 by a conveyor assembly 1. Sorting apparatuses are well known and, as they do not pertain to the invention, are not described in further detail.

Figure 2:
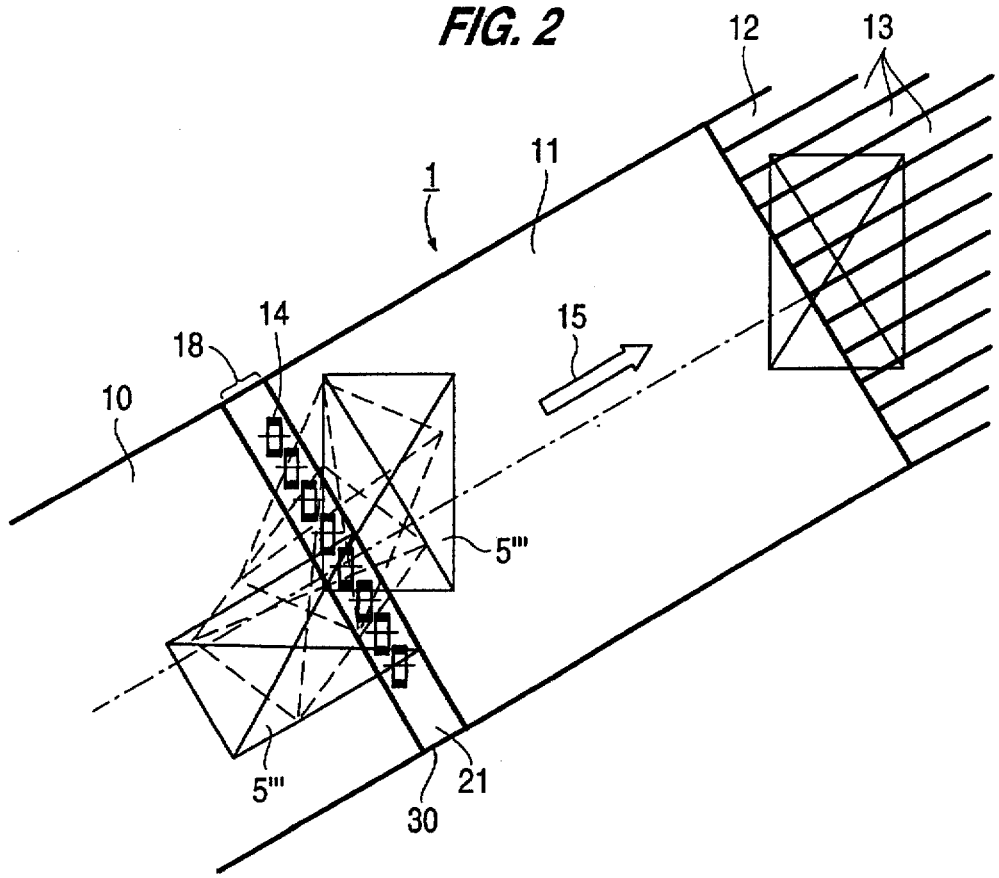
FIG. 2 is a schematic enlarged detail of FIG. 1.

Also referring to FIG. 2, the conveyor assembly 1 has a conveyor unit which, in a linear sequential arrangement, is formed of a conveyor belt 10, a cyclically operated conveyor belt 11 as well as an oblique belt 12 having a transfer edge 12' oriented parallel to the advancing direction 6 of the items 5 in the sorting apparatus 2. The oblique belt 12 is formed, in a conventional manner, by a plurality of parallel partial belts 13.

Figure 3:
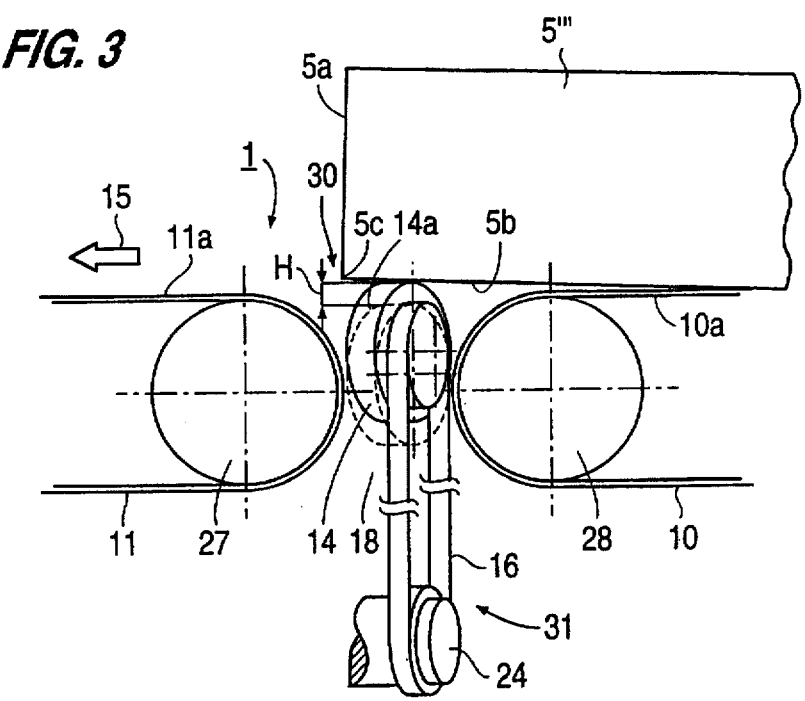
FIG. 3 is a schematic fragmentary side elevational view of the preferred embodiment.

Also referring to FIG. 3, between the conveyor belt 10 and the conveyor belt 11 a clearance 18 is provided in which a turning device 30 is accommodated. The clearance 18 which is defined by the distance between the outlet end (belt roller 28) of the conveyor belt 10 and the inlet end (belt roller 27) of the conveyor belt 11, extends preferably over the entire-width of the conveyor assembly 1 and has at its narrowest location a width of approximately 3 to 6 cm, preferably approximately 5 cm.

The turning device 30 has a plurality of orienting rollers 14 supported on a carrier 21. The rollers 14 are supported, for example, in support plates 23 and have rotary planes which are substantially perpendicular to the item-carrier surface of the conveyors 10 and 11 and are oriented parallel to one another. Further, the rotary plane of the rollers 14 is at an inclination to the conveying direction 15 in which items are advanced on conveyors 10, 11 and 12. Underneath the carrier 21 a drive 31 is located with which the orienting rollers 14 are rotated codirectionally and in unison. Also referring to FIG. 4, the drive 31 includes drive belts 16 trained around a common drive roller 24 which is supported on a stand 25 and which is coupled with a non-illustrated motor. The drive 31 is designed such that the orienting rollers 14 with the carrier 21 may be height adjustable for example, by means of pneumatic cylinders 22 operated by means of a conventional pneumatic control circuit 33, schematically shown in FIG. 4. In FIG. 3 the rollers 14 are shown in solid lines in the raised position and in broken lines in the lowered position. The optimal stroke H is, for example, 1 cm. In the raised state the orienting rollers 14 project by a few millimeters beyond the surface of the upper reach 11a of the conveyor belt 11 as well as the upper reach 10a of the conveyor belt 10. In the lower, broken-line position the orienting rollers 14 are withdrawn into the clearance 18. The direction of rotation of the orienting rollers 14 is designated with the arrow 32 in FIG. 4. The orienting rollers 14 have a circumferential surface 14a which has preferably a high coefficient of friction; they may be, for example, rubber rollers.

The conveyor belt 10 is, as viewed in its running direction 15, arranged upstream of the turning device 30 and may be a conventional belt. As shown in FIG. 1, stationary aligning shoes 8 and 9 extend laterally over the conveyor belt 10 in a sequential arrangement.

In the description which follows, the operation of the conveyor assembly according to the invention will be set forth.

Figure 4:
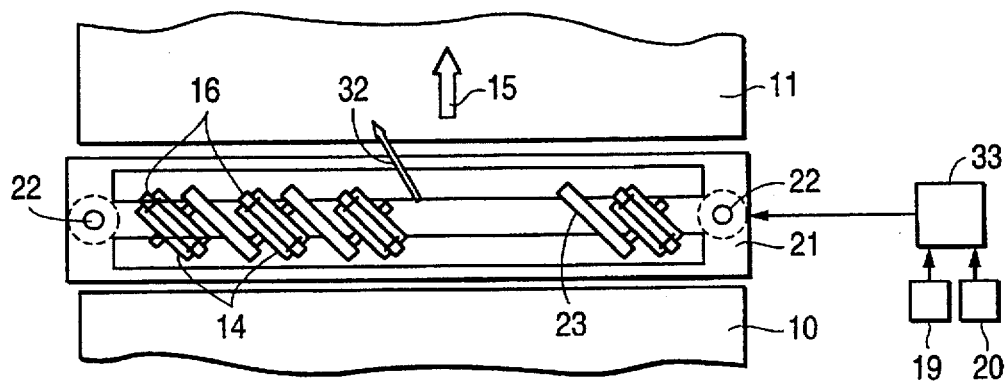
FIG. 4 is a schematic fragmentary top plan view of the preferred embodiment.
Figure 5:
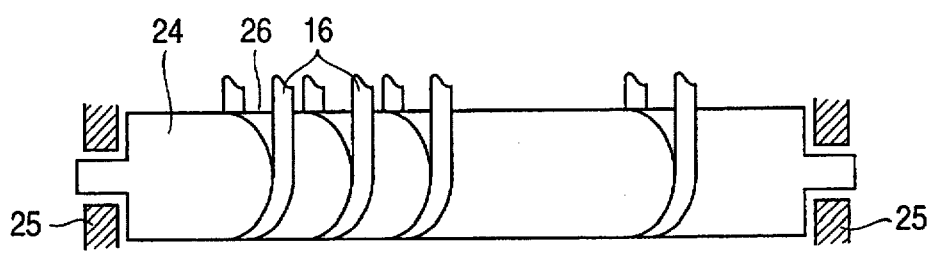
FIG. 5 is a schematic side elevational view of a detail of the structure shown in FIG. 4.

The items to be sorted are manually or mechanically placed on the conveyor belt 10 upstream of the aligning shoe 8 in a preferably approximate alignment. The deposited items 5' are further aligned by the aligning shoe 8 as indicated in FIG. 1. Relatively long items 5' are positioned by the aligning shoe 8 in such a manner that they are, by means of the subsequent aligning shoe 9 on the other side of the conveyor 10, aligned such that a narrow side 5a becomes the leading end as viewed in the conveying direction 15. FIG. 1 shows such a longitudinal alignment of items 5" by the aligning shoe 9. At the height of the aligning shoe 9 light barriers 19 and 20 are spacedly and sequentially arranged, by means of which the length of an item 5" may be accurately determined. If the light barriers 19 and 20 detect a particularly long item 5" which has to be subsequently aligned, the orienting rollers 14 are brought into their full-line, raised position illustrated in FIG. 3. For this purpose the light barriers 19, 20 are coupled to the control circuit 33 as shown in FIG. 4.

The leading edge 5c of an item 5'" which reaches the clearance 18 is, approximately in the mid zone of the clearance 18, engaged by the driven orienting rollers 14 and slightly raised as illustrated in FIG. 3. Some or all of the orienting rollers 14 are thus with their upper peripheral portions 14a in engagement with the underside 5b of the item 5'". Since the plane of rotation of the orienting rollers 14 is at an oblique angle to the conveying direction 15 of the conveyor 10, the item 5" is exposed to a force component transverse to the above-noted conveying direction and is turned into the desired oblique position according to the orientation of the turning device 30. Since the item 5'" lies on the conveyor belt 10 only with its trailing edge, the required force for turning the item is relatively small. The turning occurs during the course of a continuous conveyance of the item 5'". The orienting rollers 14 are lowered not later than when the middle of the item 5'" has reached the orienting rollers 14 to thus prevent a reverse turning of the item. The turning angle may be controlled very accurately by the length of the engagement of the orienting rollers 14 at the item 5'". Preferably, the length L determined by the optical barriers 19 and 20 is utilized. If items 5 of identical length are conveyed, such a length measurement may be dispensed with. This may also be the case when no stringent requirements are placed on the accuracy of the alignment.

Reverting to FIG. 2, there is schematically illustrated the turning motion of the item 5'". As soon as the item 5'" is aligned, it is engaged by the cyclically operated belt 11 and transferred to the oblique belt 12 which, in turn, transfers the item 5 to a predetermined carriage 3 at the discharge end (terminal edge) 12' of the conveyor 12. A construction is also feasible where more than one item is transferred to a carriage 3. As shown in FIG. 1, the items 5 transferred to the carrier support plate 4 are aligned relatively to the conveying direction 6 of the sorting apparatus 2, so that the items 5 may be substantially of the same size as the support plates 3 without the items projecting therebeyond.

It will be understood that the above description of the present invention is susceptible to various modifications, changes and adaptations, and the same are intended to be comprehended within the meaning and range of equivalents of the appended claims.

What is claimed is:

1. A conveyor assembly for reorienting items, comprising
   (a) a conveyor unit having a carrier surface for advancing items thereon in a conveying direction; said conveyor unit having a discharge end;
   (b) turning means disposed upstream of said discharge end as viewed in said conveying direction and at least partially underneath said conveyor unit for engaging an underface of the items and for turning the items into a predetermined orientation while being conveyed by said conveyor unit before the items reach said discharge end; said turning means including
      (1) a roller having an item-engaging periphery;
      (2) supporting means for supporting said roller for rotation in a rotary plane oriented substantially perpendicularly to said carrier surface and at an oblique angle to said conveying direction;
      (3) driving means for rotating said roller, whereby an item engaged by said roller is turned into an orientation corresponding to said oblique angle; and
      (4) lifting means for raising said roller into an operative position in which a part of said periphery projects above said carrier surface of said conveyor unit and for lowering said roller into an inoperative position in which said periphery is situated entirely below said carrier surface;
   (c) sensor means for determining a length dimension of the items measured parallel to said conveying direction; and
   (d) means for connecting said sensor means to said lifting means for moving said roller into said operative position upon sensing a predetermined minimum value for said length dimension.

2. A conveyor assembly for reorienting items, comprising
   (a) a conveyor unit having a carrier surface for advancing items thereon in a conveying direction; said conveyor unit having a discharge end; said conveyor unit including
      (1) a first conveyor having an outlet end;
      (2) a cyclical second conveyor being serially aligned with said first conveyor and having an inlet end adjoining said outlet end of said first conveyor; and (3) a clearance defined between said outlet of said first conveyor and said inlet of said second conveyor; and (b) turning means disposed upstream of said discharge end as viewed in said conveying direction and at least partially underneath said conveyor unit for engaging an underface of the items and for turning the items into a predetermined orientation while being conveyed by said conveyor unit before the items reach said discharge end; said turning means being accommodated in said clearance.

3. The conveyor assembly as defined in claim 2, further comprising sensor means for determining a length dimension of the items measured parallel to said conveying direction.

4. The conveyor assembly as defined in claim 2, wherein said turning means comprises (a) a roller having an item-engaging periphery;

(b) supporting means for supporting said roller for rotation in a rotary plane oriented substantially perpendicularly to said carrier surface and at an oblique angle to said conveying direction; and (c) driving means for rotating said roller, whereby an item engaged by said roller is turned into an orientation corresponding to said oblique angle.

5. The conveyor assembly as defined in claim 2, further comprising an aligning shoe stationarily supported above said carrier surface in a path of conveyance of the items on said carrier surface, at a location upstream of said turning means, as viewed in said conveying direction.

6. The conveyor assembly as defined in claim 2, further comprising a plurality of aligning shoes stationarily supported above said carrier surface in a path of conveyance of the items on said carrier surface, at a location upstream of said turning means, as viewed in said conveying direction; said aligning shoes being spaced from one another in said conveying direction.

7. The conveyor assembly as defined in claim 4, further comprising lifting means for raising said roller into an operative position in which a part of said periphery projects above said carrier surface of said conveyor unit and for lowering said roller into an inoperative position in which said periphery is situated entirely below said carrier surface.

8. The conveyor assembly as defined in claim 7, further comprising sensor means for determining a length dimension of the items measured parallel to said conveying direction; and means for connecting said sensor means to said lifting means for moving said roller into said operative position upon sensing a predetermined minimum value for said length dimension.

9. A conveyor assembly for reorienting items, comprising (a) a conveyor unit having a carrier surface for advancing items thereon in a conveying direction; said conveyor unit having a discharge end; said conveyor unit including (1) a first conveyor having an outlet end;

(2) a second conveyor being serially aligned with said first conveyor and having an inlet end adjoining said outlet end of said first conveyor; and (3) a clearance defined between said outlet of said first conveyor and said inlet of said second conveyor; and (b) turning means disposed upstream of said discharge end as viewed in said conveying direction and at least partially underneath said conveyor unit for engaging an underface of the items and for turning the items into a predetermined orientation while being conveyed by said conveyor unit before the items reach said discharge end; said turning means being accommodated in said clearance and including (1) a plurality of rollers each having an item-engaging periphery;

(2) supporting means for supporting said rollers for rotation in parallel-spaced rotary planes each oriented substantially perpendicularly to said carrier surface and at an oblique angle to said conveying direction; and (3) driving means for rotating said rollers, whereby an item engaged by at least some of said rollers is turned into an orientation corresponding to said oblique angle.

10. The conveyor assembly as defined in claim 9, wherein said driving means comprises (a) a common drive shaft; and (b) separate drive belts trained about said common drive shaft and about respective said rollers.

11. The conveyor assembly as defined in claim 9, further comprising sensor means for determining a length dimension of the items measured parallel to said conveying direction; and means for connecting said sensor means to said lifting means for moving said rollers into said operative position upon sensing a predetermined minimum value for said length dimension.

* * * * *